United States Patent
Ludlow et al.

(10) Patent No.: US 11,649,165 B2
(45) Date of Patent: May 16, 2023

(54) IN SITU APPARATUS AND METHOD FOR PROVIDING DEUTERIUM OXIDE OR TRITIUM OXIDE IN AN INDUSTRIAL APPARATUS OR METHOD

(71) Applicant: SKYRE, INC., East Hartford, CT (US)

(72) Inventors: Daryl Ludlow, Diamond Point, NY (US); Glenn Eisman, Bailey Island, ME (US); Trent M. Molter, South Windsor, CT (US)

(73) Assignee: SUSTAINABLE INNOVATIONS, INC., East Hartford, CT (US)

( * ) Notice: Subject to any disclaimer, the term of this patent is extended or adjusted under 35 U.S.C. 154(b) by 92 days.

(21) Appl. No.: 16/910,202

(22) Filed: Jun. 24, 2020

(65) Prior Publication Data
US 2020/0346927 A1 Nov. 5, 2020

Related U.S. Application Data

(63) Continuation of application No. 15/885,898, filed on Feb. 1, 2018, now abandoned.
(Continued)

(51) Int. Cl.
*C01B 4/00* (2006.01)
*B01D 53/047* (2006.01)
(Continued)

(52) U.S. Cl.
CPC .............. *C01B 4/00* (2013.01); *B01D 53/047* (2013.01); *B01D 53/326* (2013.01); *B01D 59/12* (2013.01);
(Continued)

(58) Field of Classification Search
CPC ....... C25B 59/30; C25B 59/40; B01D 53/326; B01D 59/40; B01D 59/50; C01B 4/00; C01B 5/02
See application file for complete search history.

(56) References Cited

U.S. PATENT DOCUMENTS

| 4,054,496 A | 10/1977 | Arrathoon |
| 4,444,737 A | 4/1984 | Tsuchiya |

(Continued)

FOREIGN PATENT DOCUMENTS

| CN | 102449840 A | 5/2021 |
| EP | 3509725 A1 | 7/2019 |

(Continued)

OTHER PUBLICATIONS

Greenway, S. et al. "Proton exchange membrane (PEM) electrolyzer operation under anode liquid and cathode vapor feed configurations", International Journal of Hydrogen Energy, 2009, vol. 34, pp. 6603-6608.

(Continued)

*Primary Examiner* — Ciel P Contreras
(74) *Attorney, Agent, or Firm* — Cantor Colburn LLP (57) ABSTRACT

In an aspect, an electrochemical hydrogen isotope recycling apparatus for recycling a feedstream comprising a single isotope of hydrogen, comprising: an electrochemical recycling unit, the unit comprising an anode; a cathode; an isotope-treated, cation exchange membrane operatively disposed between the anode and cathode, the isotope-treated, cation exchange membrane having heavy water containing the isotope of hydrogen therein, the unit configured to receive the feedstream containing the single isotope of hydrogen; wherein the single isotope is deuterium or tritium and when the single isotope is deuterium, the heavy water comprises $D_2O$ and when the single isotope is tritium, the heavy water is $T_2O$.

20 Claims, 8 Drawing Sheets

Related U.S. Application Data (60) Provisional application No. 62/469,434, filed on Mar. 9, 2017.

(51) Int. Cl.
  | | |
  |---|---|
  | *B01D 59/40* | (2006.01) |
  | *B01D 53/32* | (2006.01) |
  | *B01D 59/12* | (2006.01) |
  | *B01D 59/50* | (2006.01) |

(52) U.S. Cl.
  CPC ............. *B01D 59/40* (2013.01); *B01D 59/50* (2013.01); *B01D 2257/80* (2013.01); *Y02C 20/30* (2013.01)

(56) References Cited

U.S. PATENT DOCUMENTS

| | | | |
|---|---|---|---|
| 5,080,693 | A | 1/1992 | Bourne et al. |
| 5,733,435 | A * | 3/1998 | Prasad ................ B01D 71/024 |
| | | | 205/765 |
| 6,332,914 | B1 | 12/2001 | Lee |
| 6,638,413 | B1 | 10/2003 | Weinberg et al. |
| 8,663,448 | B2 | 3/2014 | Eisman |
| 8,734,632 | B1 | 5/2014 | Eisman |
| 2002/0119356 | A1 | 8/2002 | Shimanuki et al. |
| 2004/0074780 | A1 | 4/2004 | Twardowski |
| 2007/0246344 | A1 | 10/2007 | Bonnett et al. |
| 2009/0029202 | A1 | 1/2009 | Hossain et al. |
| 2011/0044416 | A1 | 2/2011 | Galindo Cabello et al. |
| 2013/0220240 | A1 | 8/2013 | Jonson et al. |
| 2013/0327632 | A1 | 12/2013 | Hayashida et al. |
| 2015/0001092 | A1 | 1/2015 | Preston |
| 2016/0053387 | A1 | 2/2016 | Kutchcoskie et al. |
| 2016/0310898 | A1 | 10/2016 | Denton et al. |
| 2016/0368789 | A1 | 12/2016 | Manabe et al. |
| 2018/0056240 | A1 | 3/2018 | Xiao et al. |
| 2018/0071678 | A1 | 3/2018 | Ludlow et al. |
| 2018/0209051 | A1 | 7/2018 | Baker et al. |
| 2018/0257933 | A1 | 9/2018 | Ludlow et al. |
| 2019/0336911 | A1 | 11/2019 | Ludlow et al. |

FOREIGN PATENT DOCUMENTS

| | | |
|---|---|---|
| JP | S6036302 A | 2/1985 |
| JP | S62210039 A | 9/1986 |
| JP | H04249737 A | 9/1992 |
| WO | 2016027479 A1 | 2/2016 |

OTHER PUBLICATIONS

Iwahara, H. "Prospect of hydrogen technology using proton-conducting ceramics", Solid State Ionics, 2004, vol. 168, pp. 299-310.

Matsumoto, H. et al. "Electromotive Force of Hydrogen Isotope Cell with a High Temperature Proton-Conducting Solid Electrolyte CaZr0.90In0.10O32a", Journal of The Electrochemical Society, 1999, vol. 146, Issue 4, pp. 1486-1491.

Adhikar et al., "Hydrogen Membrane Separation Techniques," Ind. Eng. Chem. Res. 2006, pp. 875-881, vol. 45.

Greenway, Scott D., et al., "Proton exchange membrane (PEM) electrolyzer operation under anode liquid and cathode vapor feed configurations" International Journal of Hydrogen Energy, 2009, vol. 34, Issue 16, pp. 6603-6608.

Han, Jun Hee, "Nuclear Magnetic Resonance and Impedance Spectroscopy Study of Perfluorosulfonic Acid Membrane Nafion" Department of Physics, Korea University, Feb. 2016, pp. 21-30, 73-80.

International Search Report; International Application No. PCT/US2018/020844; International Filing Date: Mar. 5, 2018; dated Jun. 28, 2018; 3 pages.

Written Opinion; International Application No. PCT/US2018/020844; International Filing Date: Mar. 5, 2018; dated Jun. 28, 2018; 11 pages.

Hibino et al., "H/D Isotope Effect on Electrochemical Pumps of Hydrogen and Water Vapor Using a Proton-Conductive Solid Electrolyte," Sep. 1, 1993, Journal of the Electrochemical Society, vol. 140 No. 9, pp. 2588-2592.

\* cited by examiner

IN SITU APPARATUS AND METHOD FOR PROVIDING DEUTERIUM OXIDE OR TRITIUM OXIDE IN AN INDUSTRIAL APPARATUS OR METHOD

CROSS REFERENCE TO RELATED APPLICATIONS

This application claims the benefit of Provisional Application No. 62/450,841, filed Jan. 26, 2017 and is a continuation application of U.S. application Ser. No. 15/885,898, filed Feb. 1, 2018, both of which are incorporated by reference in their entirety herein.

BACKGROUND

The diatomic molecular isotopes of hydrogen, including deuterium and tritium, are useful in a wide variety of commercial and industrial processes to advantageously improve the properties of a wide variety of products including food and nutrition products, agricultural products, semiconductors, fiber optics, optoelectronics, and others. While there is a strong desire to utilize these isotopes in numerous products and processes, such use has generally been hindered by the high cost associated with the relative scarcity.

Various processes and equipment are used to recycle and reclaim hydrogen, including electrochemical processes and equipment, such as electrochemical pumping using electrochemical pumps. However, these processes and equipment are not generally effective to recycle and reclaim isotopes of hydrogen in high purity.

As such, it is very desirable to develop cost effective processes and equipment to reclaim these isotopes, deuterium and tritium, in high purity so that they may be recycled and reused in the processes in which they are employed, or for use in alternative applications.

In some equipment and processes that employ deuterium and tritium, there is also an apparatus/process requirement for heavy water ($D_2O$), or super heavy water ($T_2O$), which is expensive and difficult to obtain. As such, providing the heavy water, or super heavy water, in situ would also be very desirable. However, there are no known equipment and processes that employ deuterium and tritium that also provide in situ heavy water, or super heavy water.

There are processes that require the use of $D_2$ (or other H isotopes) but do not chemically consume or otherwise alter the substance that is being processed. Recovery techniques such as electrochemical pumping, compression and purification may be employed to reclaim and recycle this high value substance. However, in some cases it may be more economical or technically feasible to chemically react $D_2$ so as to form another D-containing substance that can be recovered and reused in the process or used in second process. This second D containing molecule may also be acted upon chemically or electrochemically to regenerate $D_2$ gas. The preferred deuterium containing molecule in this invention is heavy water, $D_2O$, which also is very expensive.

SUMMARY OF THE DISCLOSURE

The present invention comprises an electrochemical recycling device and method to recycle high purity molecular hydrogen, comprised of any of its isotopes, $^1H$, $^2H$ or D (deuterium), and $^3H$, T (tritium), from any application that is hydrogen (H) or hydrogen isotope (D, T) intensive. The symbol $^xH$ represents the atomic weight, which reflects the number of protons and neutrons in the nucleus. A hydrogen atom does not have neutrons, yet deuterium and tritium do, adding one for deuterium, and two for tritium. The various isotopes may vary in neutrons and therefore the atomic weight, but all isotopes are still considered to be hydrogen (IR-3.3.2 Provisional Recommendations". Nomenclature of Inorganic Chemistry. Chemical Nomenclature and Structure Representation Division, IUPAC. Retrieved 2007-10-03.)

In one embodiment, the present apparatus and method of the invention comprises hydrogen compression technology using electrochemical cells to compress an input gas that includes diatomic molecular hydrogen or any of its isotopes to provide a purity output equal to, or greater than that of the input hydrogen or the isotope of interest. For example, the apparatus may be used to treat a deuterium and/or tritium process stream to recover, recycle, reuse and compress high purity deuterium and/or tritium. The apparatus and method of the invention can be used with a furnace that has a controlled hydrogen or a hydrogen isotope atmosphere, as delineated in U.S. Pat. Nos. 8,663,448 and 8,734,632, which are incorporated herein by reference in their entirety. The apparatuses and methods of the invention may also be used in any process that employs gaseous molecular hydrogen or hydrogen isotopes in a treatment chamber or as part of a gaseous process flow stream. The gaseous molecular hydrogen or hydrogen isotope that is received from an external hydrogen intensive process can be separated from other gases, purified, and then either returned to the original application, or sent to a different application altogether. The recovered molecular hydrogen or hydrogen isotope gas may also be sent to a storage facility for later use. Similar options are possible for compression of processed molecular hydrogen or hydrogen isotopes. Furthermore, the two processes (separation and compression) may be used independent of one another or in combination. Furthermore, electrochemical hydrogen separation and compression may be accomplished in the same device, possessing both separation characteristics and be able to compress the hydrogen in a single unit.

This invention relates to maintaining or improving the purity of hydrogen and/or its isotopes in a separation device when it is important to maintain a high purity specification of a given isotope when using electrochemical methods, regardless of the electrochemical method employed. Electrochemical apparatuses and methods of the invention include those that use proton exchange membranes, liquid acid imbibed host matrices, e.g., apparatuses and methods that use phosphoric acid. Other acids and proton conductors may be used as well. This also includes apparatuses and methods that utilize solid acid proton transport materials such as cesium hydrogen phosphate or the like as another example of a proton transport medium in an electrochemical process. The degree of purification, or the degree of isotope purity of the recycled gas, is dictated by the purity requirements of the hydrogen intensive application. An example of an application that would benefit from such a device with the aforementioned characteristics is in the semiconductor fabrication industry where hydrogen isotopes, particularly deuterium, are used as at least one constituent of an input gas flow stream to provide a treatment atmosphere in semiconductor wafer processing because the hydrogen isotope atmosphere, particularly deuterium, provides enhanced and advantageous material properties to the semiconductor materials, particularly optoelectronic semiconductor materials, treated therein.

The methods of this invention may also be used in conjunction with electrolysis processes that are used to recover hydrogen or hydrogen isotopes. This invention relates specifically to the diatomic molecules $H_2$, $D_2$, and or $T_2$. D and T are sometimes referred to as "heavy" hydrogen. This invention can be used to deliberately and selectively recover a high purity gaseous product of $H_2$, $D_2$, and or $T_2$ or a high purity predetermined mixture of H, D, or T in a given process. For example, this includes predetermined HD, HT, and DT based molecule concentrations.

An electrochemical hydrogen isotope recycling apparatus for recycling an isotope of hydrogen is disclosed. The apparatus includes an electrochemical recycling unit, the unit comprising: an anode; a cathode; and an isotope-treated, water-based proton exchange membrane operatively disposed between the anode and cathode, the isotope-treated, water-based proton exchange membrane having heavy water containing the isotope of hydrogen therein, the device configured to receive a feed stream containing the isotope of hydrogen.

A process by which high purity hydrogen isotope products are produced is disclosed. The process comprises an electrochemical membrane process in which all conventional water containing components are pre-processed using a heavy water isotope of hydrogen.

In one embodiment, an apparatus and method that are configured to and allow for the recovery of D and/or T in the form of $D_2O$ and/or $T_2O$ is disclosed. This apparatus and method can be used with any hydrogen isotope, including both deuterium and tritium.

In another embodiment, an apparatus and method that are configured to prevent the loss of high value $D_2$ and/or $T_2$ in a process waste stream is disclosed. This is very advantageous because deuterium and/or tritium are very expensive, regardless of their phase, and prevention of their loss makes their use economically possible in a number of industrial applications.

In another embodiment, an apparatus and method that relate to the processing of the hydrogen isotopes deuterium and tritium is disclosed. Rather than recovering and purifying $D_2$ and/or $T_2$ while in gaseous form, this embodiment is an apparatus and method or process by which D and/or T is combined with an oxidant to form $D_2O$ and/or $T_2O$, respectively. In another embodiment of the invention, the D and/or T may be reacted with another molecule (not containing oxygen), which can be easily separated from the initial gaseous deuterium and/or tritium supply, and then in a second chemical reaction, such intermediate molecule is reacted or combusted in the presence of oxygen to form $D_2O$ and/or $T_2O$, respectively. Furthermore, if the desired product is $D_2O$ and/or $T_2O$, respectively, the $D_2$ and/or $T_2$ can also be converted to $D_2O$ and/or $T_2O$ through the use of a fuel cell.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

Appendix A is a copy of U.S. Pat. No. 8,663,448, which is incorporated herein by reference in its entirety; and Appendix B is a copy of U.S. Pat. No. 8,734,632, which is incorporated herein by reference in its entirety.

DESCRIPTION OF THE EMBODIMENTS

The following description is merely exemplary in nature and is not intended to limit the present disclosure, its application or uses. It should be understood that throughout the drawings, corresponding reference numerals indicate like or corresponding parts and features.

The invention is based on the discovery that processing any of the three isotopes of hydrogen in the presence of second isotope of hydrogen (or third), yields an impure recycled product (mixture) from an isotopic composition perspective beyond that found in nature. In other words, it has been found that processing $D_2$, deuterium ($^2H$) in the presence of $H_2$, hydrogen ($^1H$), i.e., no neutrons, results in a recycled product gas with a mixture of $^1H$ and $^2H$ isotopes of hydrogen. Such identifications are routinely performed by analytical laboratories using mass spectrometry as well as other established hydrogen analysis techniques.

A process and electrochemical recycling device to recycle hydrogen or any of its isotopes H (hydrogen), D (deuterium), or T (tritium), from any device, application, or process that is hydrogen or hydrogen isotope intensive is disclosed. The device and process provide a new way to reclaim and recycle isotopes of hydrogen, specifically deuterium. This new method may also apply to processing tritium. In order to recycle a "heavy" (neutron containing) hydrogen species, such as deuterium and tritium, and to meet the purification requirements of the recycled species, it is necessary to understand exchange rates of hydrogen with deuterium or tritium or with their respective ionic forms (proton or a deuteron or a triton) can impact product purity. Hydrogen and its isotopes (deuterium and/or tritium) can exchange with themselves in any given process. This is necessary to understand because in addition to the proton exchange mechanism in the perfluorosulfonic acid membrane or other electrolytes used in electrochemical recycling units, any proton containing molecule, including water must be considered. Water is especially important as it is a requirement to support such ionic transport. If conventional $H_2O$ is used, it is likely that a hydrogen ion, i.e., a proton, from the water will exchange with a deuteron or $D^+$ or triton or $T^+$ containing molecule. Thereby forming all permutations of $H_2$, $D_2$, and $H_2O$ and $D_2O$, in the case of deuterium, or all permutations of $H_2$, $T_2$, and $H_2O$ and $T_2O$, in the case of tritium, and further permutations of both in the case where both are present, including $H_2$, $D_2$, $T_2$, $HD_2$, $HT_2$, $DT_2$, and $H_2O$, $D_2O$, $T_2O$, HDO, DTO. For example, $H_2O$ in the presence of deuterium may become HDO, and in the presence of tritium may become HTO, and in the presence of both may become any of the preceding or TDO, HDO. This exchange process is well defined in liquid water, heavy or not. The issue is one of purity. If a high D and/or T content is required, then the exchange mechanism with an H must be overcome or engineered around. Preventing a mixed HD or HDO, or HT or HTO species from forming is key to providing a separated, high purity $D_2$ or $T_2$ gas stream. Ancillary sub-systems required to support the electrochemical process in the stack must also be deuterium or tritium intensive.

Figure 1:
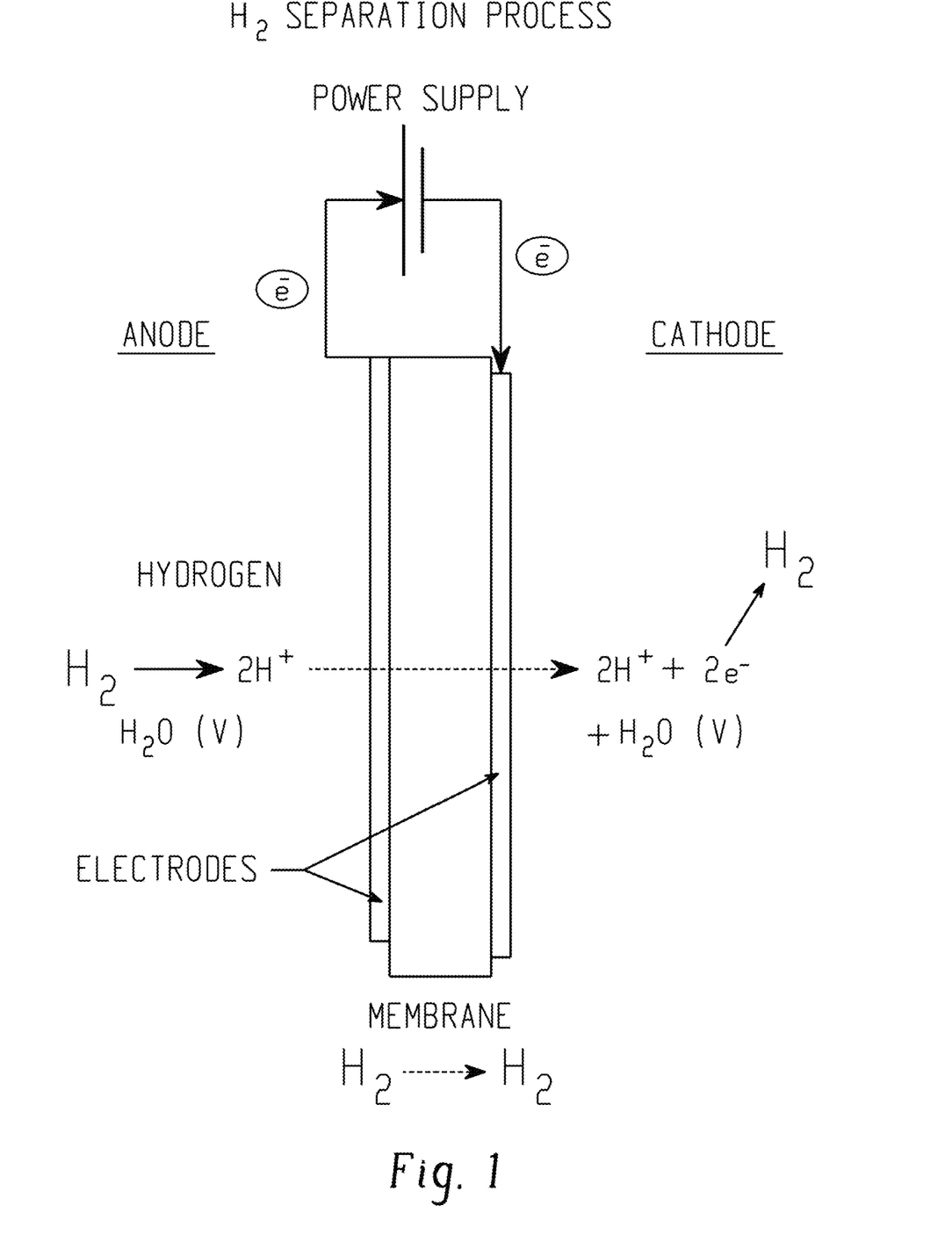
FIG. 1 is a schematic illustration of a hydrogen separation process.

This invention solves this problem and will allow for the separation and recycling of $D_2$ or $T_2$ without imparting $H^+$ ions or hydrogen containing molecules originating from water in the various sub-systems of the electrochemical system In order to recycle a "heavy" hydrogen species in an industrial application, for example deuterium, and to meet the purification requirements of the application for the recycled species, it is necessary to understand the exchange rates of hydrogen with deuterium or with their respective ionic forms (proton or a deuteron). Hydrogen and its isotopes can exchange amongst themselves in any given chemical process. Exchange means a statistical "swapping" of the atoms amongst the different isotopes. This is important because, as shown in FIG. 1 and described in the electrochemical processes mentioned above, water, a hydrogen containing molecule, is a requirement for facilitating the transport of hydrogen or hydrogen isotopes from one side of the separator, the input side (anode), to the product or output side (cathode) of the process. Furthermore, in membrane-based electrochemical separation, as well as in liquid acid based separation methods, the $H_2$ or $D_2$ or $T_2$, or mixed species mentioned above, regardless of the number of neutrons, is electrocatalytically oxidized to its constituent cations. For example, $H_2$, once in contact with the catalyst at the anode (FIG. 1), the two hydrogen atoms covalently bonded together as $H_2$, are separated into two $H^+$ cations, commonly referred to as protons in the case of $^1H$ hydrogen. It is such cations of the hydrogen isotope that are transported across the separator of the electrochemical purification device. In membrane cells, this is typically the ionic transport membrane, e.g., a perfluorosulfonic acid membrane such as Nafion®, a product of E.I. DuPont. Other membrane suppliers exist and other versions of transport membranes exist, all behaving essentially the same way. In other types of cells, it can be liquid phosphoric acid (mixture of phosphoric acid $H_3PO_4$, and water, $H_2O$). If conventional ($^1H$) $H_2O$ is used, a proton ($H^+$) from the water will exchange with a deuteron or $D^+$ containing molecule. This then allows for the formation of all permutations of $H_2$, $D_2$, and $H_2O$ and $D_2O$. For example, $H_2O$ may become HDO and $H_2$ may become DH if exposed to $D_2$. This exchange process is well defined in liquid water, heavy or not.

The issue is one of purity in that some applications must utilize one specific isotope. If a high D content is required, then the exchange mechanism with a H must be overcome or the process engineered to prevent mixing. Preventing a mixed HD or HDO species from forming is key to providing a separated, high purity $D_2$ product gas stream, or for that matter, any isotope of hydrogen. The layering of ion exchange membranes separated by cell hardware, hereafter referred to as the "stack," as well as any ancillary sub-system required to support the electrochemical process must also contain deuterium if deuterium is called for in high purity in the process.

As mentioned above, it is also important that the critical components of the system, including the separator, namely those that employ or contain hydrogen or hydrogen compounds that are capable of proton exchange (e.g., water or hydrocarbon compounds), must also contain the desired isotope of the desired purity separated product gas. In the case of Nafion® as mentioned above, all water and all protons in the as-received membrane (which contains hydrogen and hydrogen compounds that are in the membrane) must be replaced with deuterium containing molecules prior to use. The same is true for tritium-based processes. If phosphoric acid is used as the proton exchange medium in the separation process, $H_3PO_4$ must also be replaced by using $D_3PO_4$, as an example.

If the predetermined product gas or gas output is specified to be a defined mixture of H and D (or T), then knowing the proper ratios prior to use can be calculated and the proper concentrations of each utilized in the proton exchange system and components, such as the electrochemical apparatuses and methods described herein.

Figure 2A:
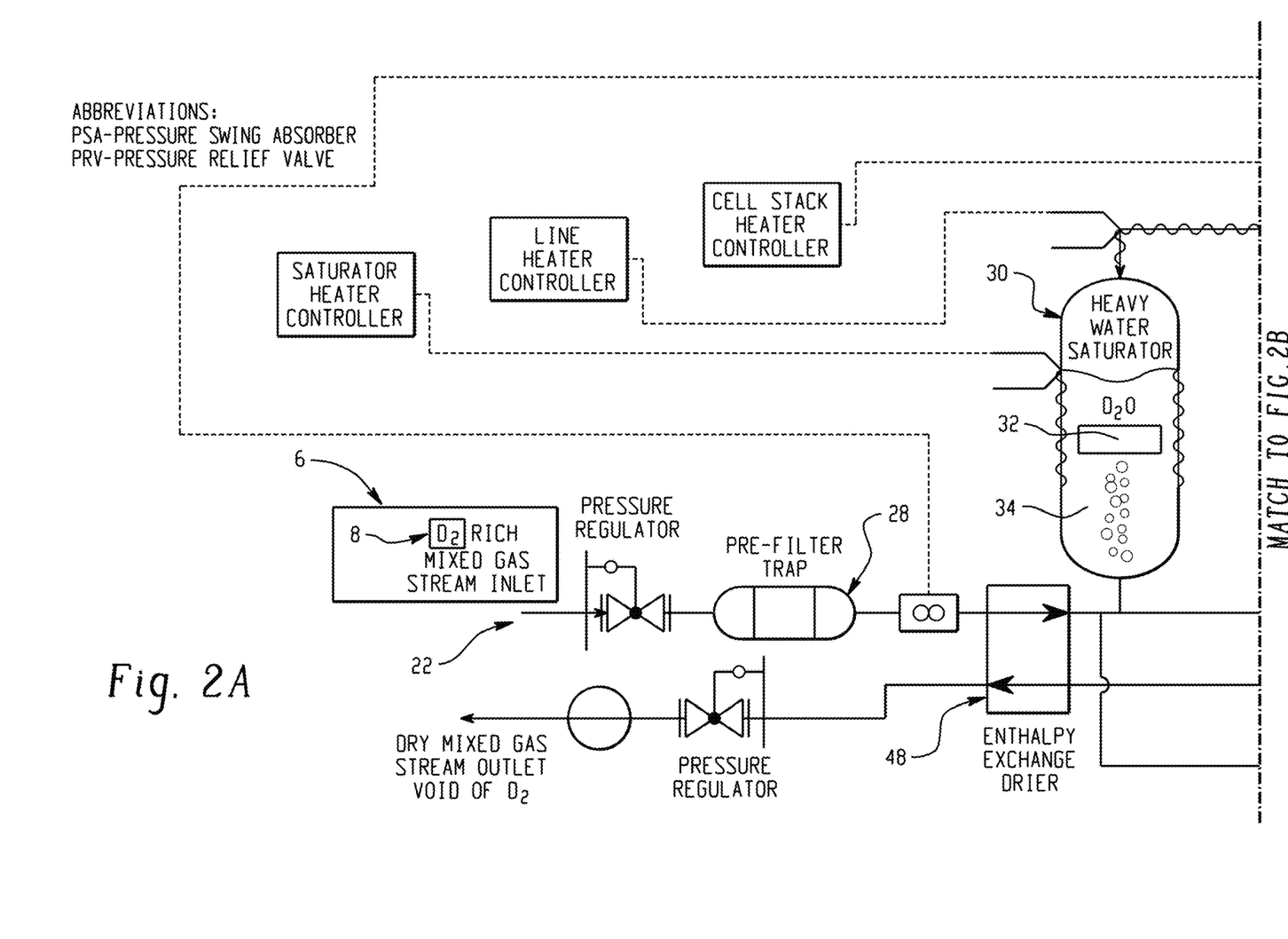
FIG. 2A and FIG. 2B combined and referred to herein as FIG. 2, represent a flow diagram of an embodiment of a recycling apparatus and method as described herein.
Figure 2B:
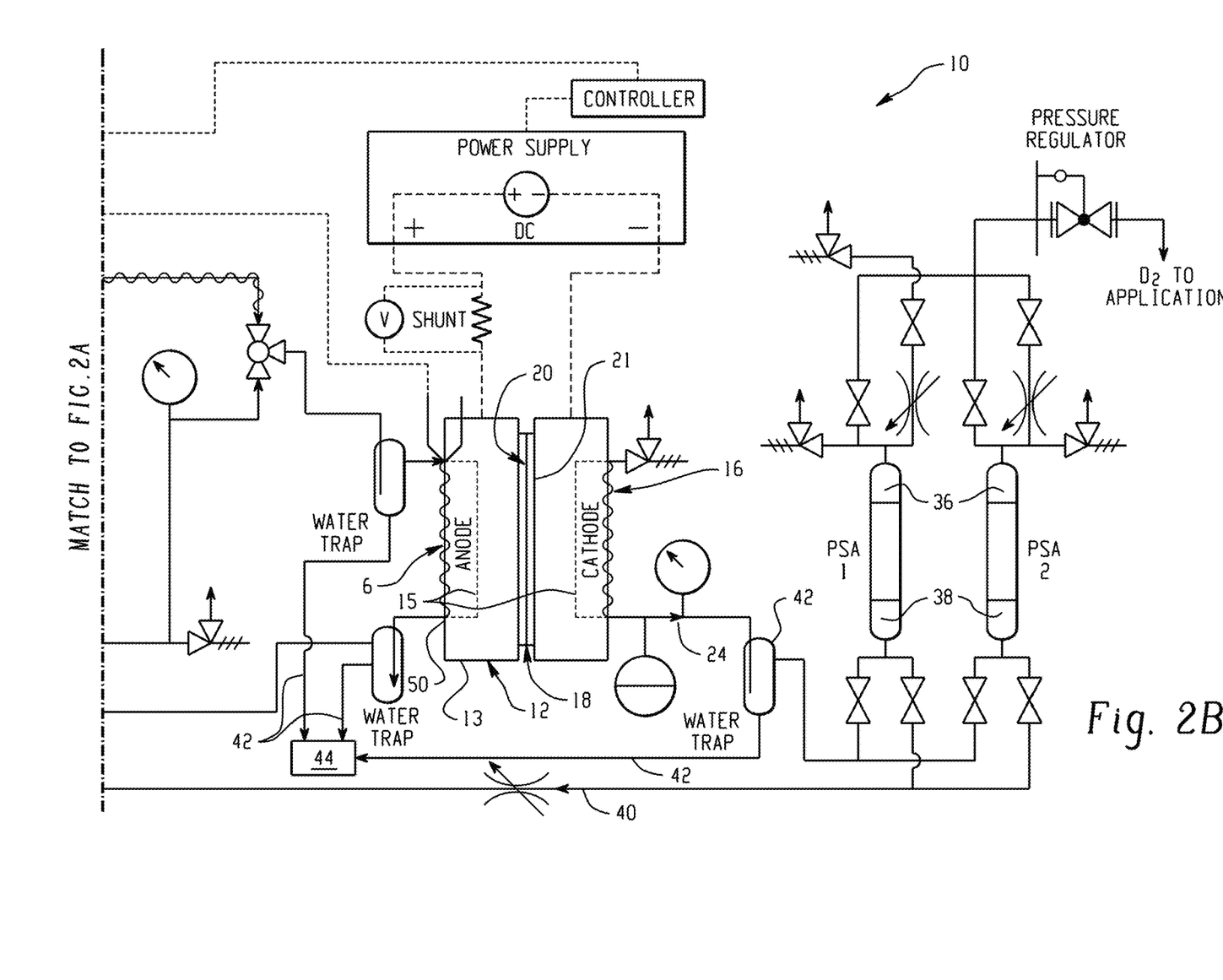
Figure 3A:
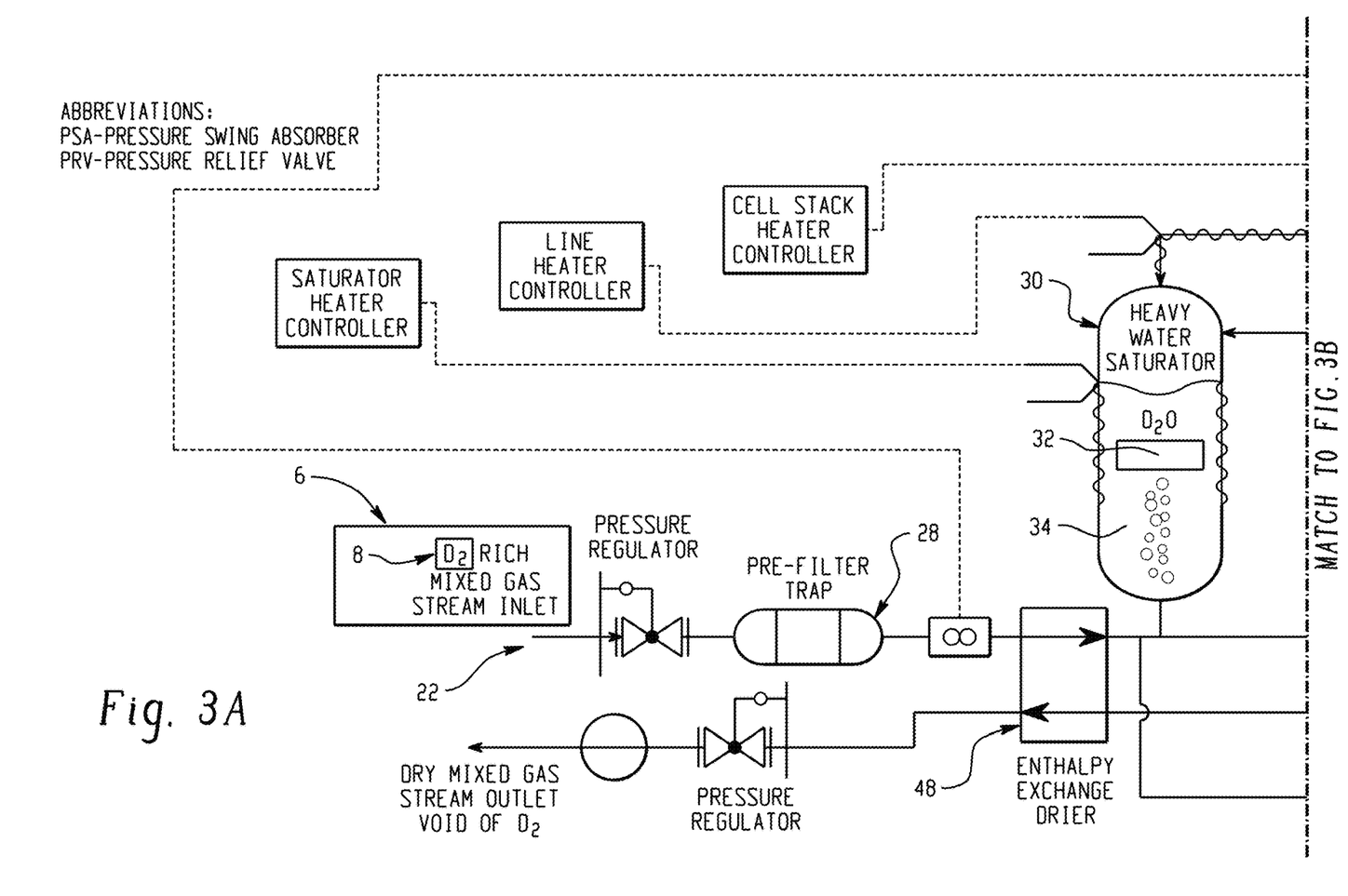
FIG. 3A and FIG. 3B combined and referred to herein as FIG. 3, represent a flow diagram of a second embodiment of a recycling apparatus and method as described herein.
Figure 3B:
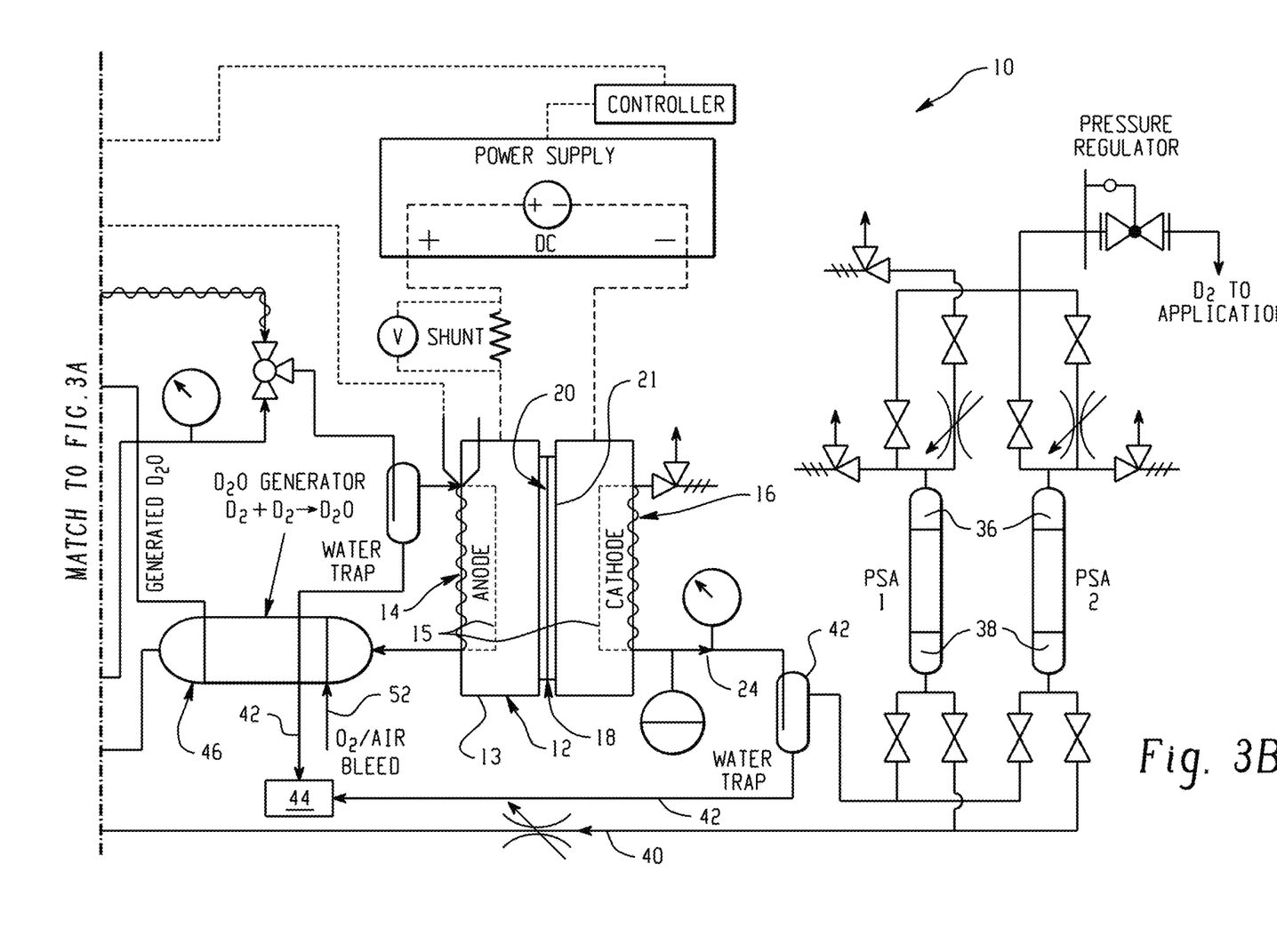
Figure 4A:
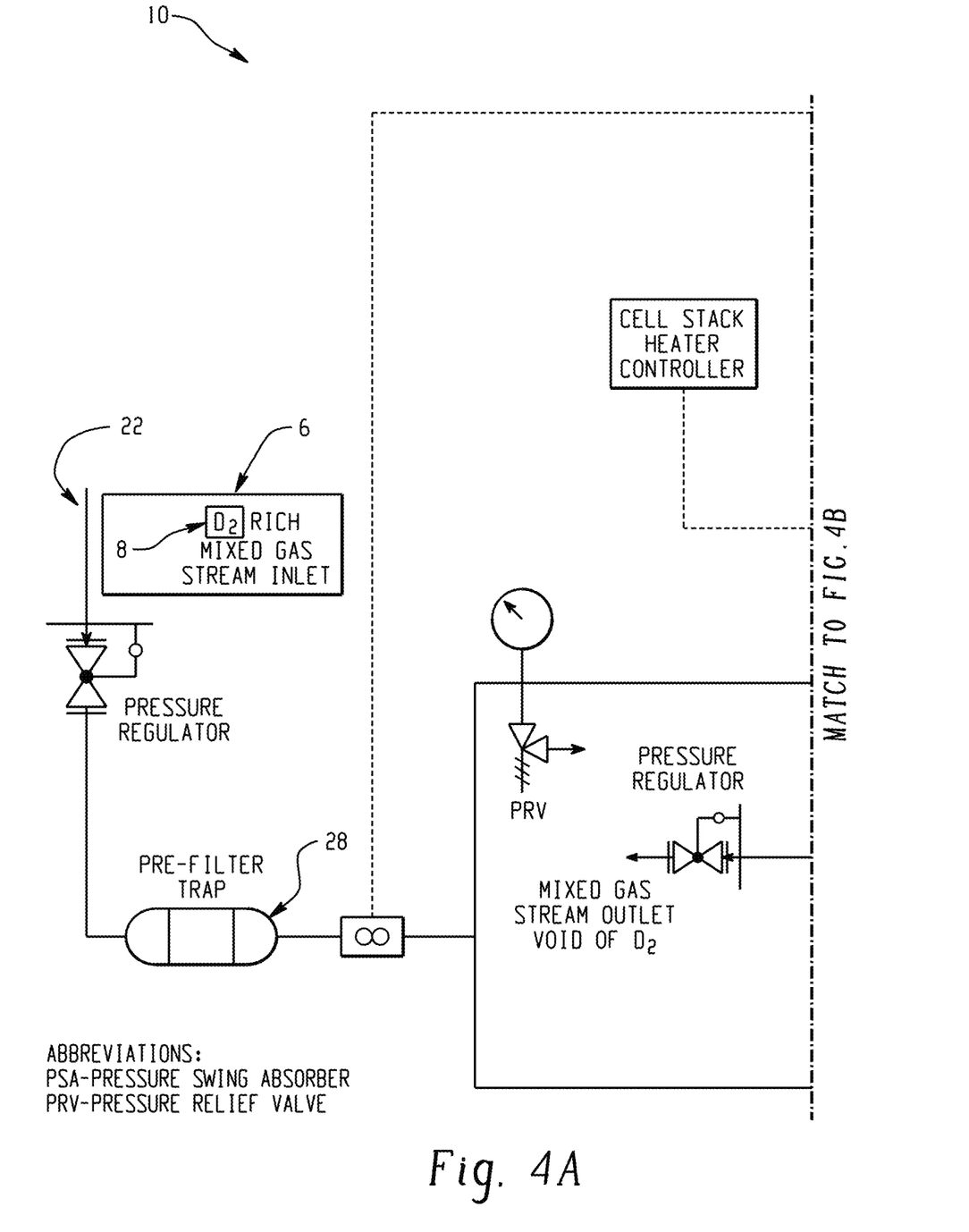
FIG. 4A and FIG. 4B combined and referred to herein as FIG. 4, represent a flow diagram of a third embodiment of a recycling apparatus and method as described herein.
Figure 4B:
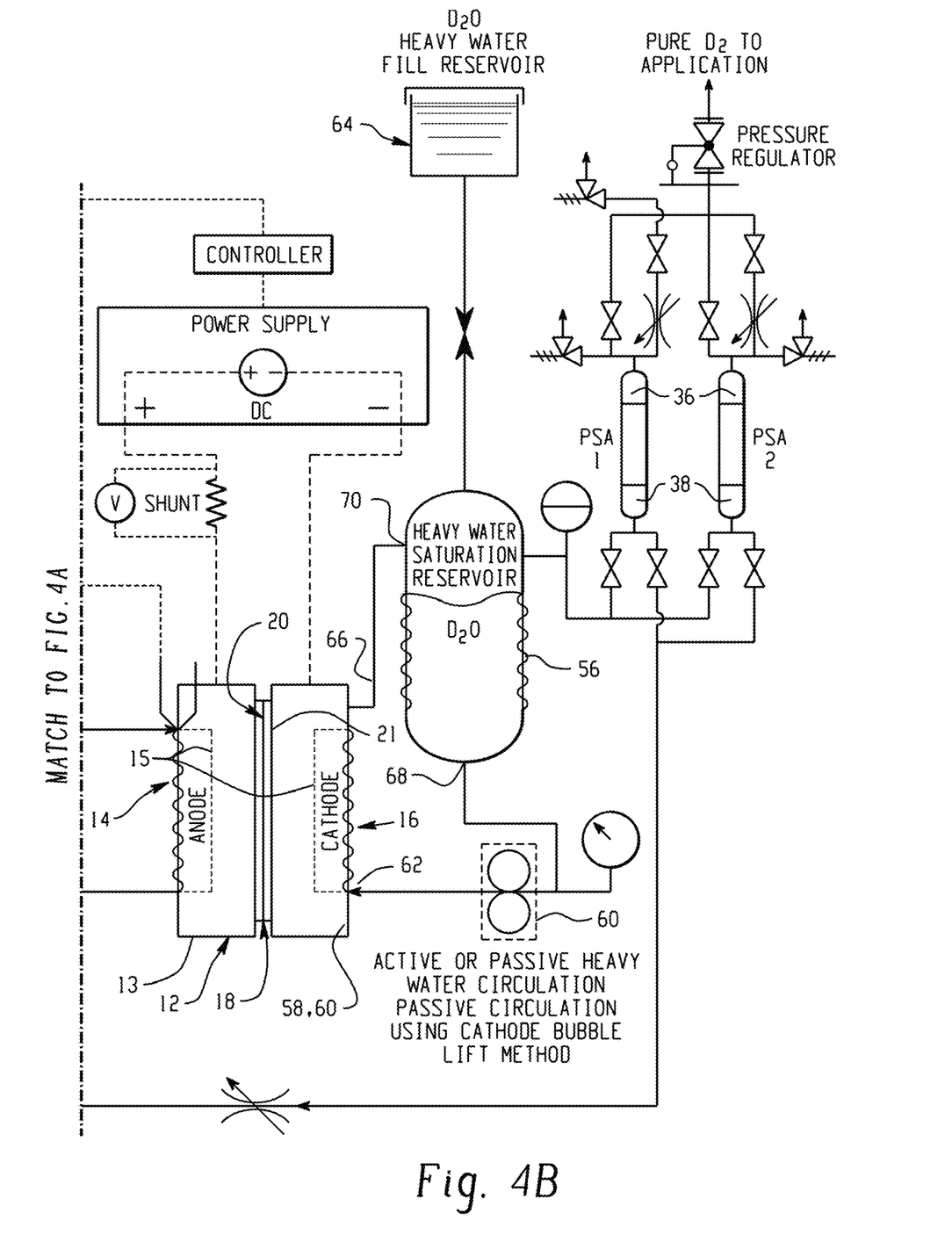

Referring to FIGS. 2-4, the problem solved by this invention is that the newly developed apparatuses and processes or methods will allow for the separation and recycling of $D_2$ without imparting $H^+$ ions or hydrogen containing molecules originating from water (containing $^1H$) in any of the various sub-systems of the electrochemical system. It also includes molecules of the materials employed in the apparatuses and methods, including the proton exchange membranes of the separator.

The apparatuses and methods of the present invention solve the problem of the inability to provide relatively pure $D_2$ from a ($^1H$, $H_2O$) proton exchange membrane electrochemical cell used in the recycling device.

The apparatuses and methods of the present invention also apply to electrochemical compression applications, as well as water electrolysis applications if "heavy" hydrogen or water is present.

Advantageously, this invention in the devices and processes described herein provides the ability to obtain relatively pure $D_2$ from a water-centric ($H_2O$) proton exchange membrane electrochemical cell used in the recycling device, which has not been possible previously.

Gas is normally graded to a specified purity. For instance, 99%, 99.9%, 99.99%, etc. Where higher purity may be required for more sensitive applications in which impurities can have a negative impact on process conditions. In the case of heavy hydrogen isotopes (deuterium, tritium), isotopic purity may be specified. This refers to the fraction of the gas that is not entirely pure and contains lighter or higher isotope impurities. For instance, semiconductor grade deuterium from one supplier is listed as better than 99.999% chemical purity (referring to non-isotope impurities) and better than 99.75% isotopic purity (referring to impurities such as HD and $H_2$).

The effectiveness of a separation process involving chemical species is partly dependent on the process mechanics itself. For example, in an electrochemical separation device, a gas phase species such as molecular hydrogen ($H_2$) is oxidized to protons and electrons at a catalyst interface. Though other gases can be present and must be separated from the $H_2$ gas stream, there can be other molecular species that can be imparted into the product stream from the electrochemical process itself. One well known impurity is water, $H_2O$. The water is part of the proton exchange membrane transport mechanism in polymeric proton exchange membrane materials, such as perfluorosulfonic acid-based membranes. Water facilitates low resistance ionic transport as the proton "hops" from one ionic site to another within the membrane. The water is incorporated into the membranes in the pretreatment of the membrane phase. The water solvates (hydrates) the ionic groups and also can hydrogen bond to other sites within the polymeric chain of a given membrane. In the case of perfluorosulfonic acid-based membranes, the water solvates (hydrates) the ionic sulfonic acid groups and also can hydrogen bond to other sites within the polymeric chain. One well known example of such a membrane material is DuPont's Nafion® series of ion exchange membranes of the perfluorosulfonic acid family. These perfluorosulfonic acid membranes have utility in water electrolyzers, fuel cells, chlor-alkali operations, to name a few. They can also be used in an electrochemical pump. The chemistry of an electrochemical pump is shown in FIG. 1. In this depiction, the water in the membrane is conventional $H_2O$, but the depiction is also applicable to $D_2O$ and $T_2O$ with suitable membranes, including Nafion®, as described herein.

The water that exits the membrane with the gas phase species of interest can be removed downstream of the electrochemical cell by conventional methods such as a cold trap, adsorbents, membrane or ceramic membranes and films, palladium separators, or even pressure swing absorption processes (PSA). In many cases the reclaimed water is desired as it can be reused in the process and therefore is beneficial to the overall efficiency of the electrochemical pump.

There is an exchange rate between hydrogen atoms or ions in hydrogen-intensive gases and solutions, meaning if a hydrogen atom of one molecule comes in contact with a second molecule which also contains a hydrogen atom, there can be a swapping effect, or exchange mechanism, by which the two hydrogen atoms or ions switch host molecules. This exchange mechanism takes place at rapid rates in liquid water. In the case of an ion exchange membrane used for proton transport applications as described above, the proton or hydrogen ion may exchange with another proton in the water that is required to make the membrane functional by humidifying it to reduce transport (ionic) resistance. The exchanged hydrogen may come from a water ($H_2O$) molecule or it may come from another gaseous $H_2$ molecule or another $H^+$ as it is driven through the membrane in the electrochemical process. The chemical formula for an example of such a reaction (Rxn 1) is:

$$H(1)-H(2)+H(3)-H(4) \leftrightarrow H(3)-H(1)+H(2)-H(4) \quad \text{(Rxn 1)}$$

or any other combination thereof. The numbers in brackets only are present to represent or label a specific hydrogen atom. If any other isotope of hydrogen is present, it can be inserted into any form of reaction 1, thereby eventually forming any or all permutations of $H_2$, HD, HT, and DT.

In the invention described below, and where there are combinations of hydrogen isotopes, such as a hydrogen, deuterium, or tritium, the exchange process may become significant and impact the desired product. For example, if $H_2$ and $D_2$ are present together as homonuclear diatomic molecules, after a period of time there will be a combination of $H_2$, $D_2$, and HD molecules. This exchange effect also takes place with water molecules such as $H_2O$, and $D_2O$, resulting in $H_2O$, $D_2O$, and DHO, and the results are analogous in the case of tritium. It can also take place between gases and liquids. For example $H_2O$ and $D_2$ will result in all combinations of H and D molecules, including DHO and DH. Furthermore, there is a high likelihood that even if $H_2O$ remains as $H_2O$, that the H itself has exchanged with another H containing molecule. This happens with hydrogen and all hydrogen isotopes, H, D, and T.

In addition to gas or liquid phase isotope exchange, evolution of gas at the cathode of the electrochemical pump combines any available proton ($H^+$, $D^+$, $T^+$) with another proton. Gas will evolve made up from any combination of available ionized isotopes.

The invention relates to the processing of hydrogen isotopes, including deuterium and tritium. In a separation and recycling process requiring high purities of deuterium or tritium relative to protons ($H^+$), the problem of conventional water-based proton exchange membranes such as Nafion®, with a deuterium atom or ion, results in a DH or a DHO species, and the case of tritium atom or ion, results in a TH or a THO species. If the predetermined input gas and output gas flows are $D_2$ or $T_2$, these species are considered impurities. If the product specification calls for high purities of $D_2$ (or $T_2$), and minimal H, then the conventional $H_2O$ containing membrane separation and transport mechanism in such electrochemical cells will contaminate the desired deuterium product. Separation of D (or T) from H after the fact is extremely complex and expensive. And considering the expense of deuterium (or tritium) molecules alone, it is desirable to maintain the high deuterium (or tritium) content of the process, including ancillary sub-systems including the humidification process used to provide water to the ion exchange membrane in the stack if such a humidifier is required.

The invention is specific to a deuterium or tritium separation process in which $D_2$ or $T_2$ in the gas phase is separated from a second or third, or more, other gas phase species using the electrochemical membrane process. In this invention, it was advantageously discovered that the membrane must be pretreated with deuterated water ($D_2O$) for deuterium separation, and tritiated water ($T_2O$) for tritium separation, also referred to as heavy water or super heavy water, respectively, prior to use. The humidifier, regardless of the method of humidification, if required, must also be pretreated by using heavy water, and furthermore there must be a $D_2O$ or $T_2O$ condensation or adsorption process downstream of the electrochemical process so as to recycle the expensive heavy water. The heavy water deuterated (or tritiated) system must be utilized on the anode stream in an electrochemical pump, or on the anode and cathode streams of a fuel cell or a water electrolyzer if high purity deuterium or tritium products are required. Furthermore we found that all components in the electrochemical separation device capable of proton exchange must be rehydrated with heavy water in the case of deuterium, and super heavy water in the case of tritium. Liquid water of proper isotope and isotopic purity may also be utilized in the cathode of an electrochemical pump for membrane hydration.

Presented in FIG. 2 is a process by which deuterium, or tritium, or any other isotope of hydrogen can be processed if high purity products are desired. In the process dry gas from which hydrogen (or isotope) enters the system (labeled as $D_2$ Rich Mixed Gas Stream Inlet). The gas is humidified using the appropriate form of water to avoid isotopic contamination (saturator). The humidified gas then enters the anode of the electrochemical pump where electrons are stripped from the gas and conducted away from the anode. The appropriate ionic form of the hydrogen isotope then passes through an ion conducting separator to the cathode. Electrons are supplied to the cathode where they combine with deuterons ($D^+$) in the case of deuterium processing, to form a new molecular gas molecule of $D_2$. The gas then exits the cathode. Gas exiting the cathode may contain high levels of water (C1). This humid cathode gas may then be dried using conventional methods in order to provide a dry product gas (e.g. Pressure Swing Absorption (PSA)). Water plays an integral role in the electrochemical process, leading to the potential for isotopic exchange. Maintaining high isotopic purity requires that the appropriate isotope of water be used for hydration when operating with a specific isotopic of hydrogen gas. For instance $D_2O$ with $D_2$, $H_2O$ with $H_2$, $T_2O$ with $T_2$, etc. One aspect of this invention includes approaches to capture and reuse heavy waters. Another aspect includes pre-treatment of various components so as to avoid isotopic contamination.

As stated above, and a surprising outcome of generating single isotope product gas, using the most commonly used separator as an example (Nafion®), the electrochemical pump membrane must be pretreated with $D_2O$ in the case of deuterium separation (or $T_2O$ if tritiated). In this step the ionic form of Nafion® or its equivalent, must be hydrated with $D_2O$. The process can occur at the time of the membrane fabrication, once the membrane is in the ionic, or sulfonic acid form. If done at the time of ionization of the sulfonyl fluoride moiety attached to the perfluorosulfonic acid membrane, the complexity of the chemistry and handling of the polymer in the presence of $D_2O$ would be great, leading to a high expense. It is more attractive to treat the membrane once it is in its sulfonic acid form and hydrated with conventional water. In this case the conventional water will be rehydrated with deuterated, or heavy water, or tritiated, or super heavy water. This can be done regardless of whether the polymer is in the form of pellets or already fabricated into sheets. To do so would involve conventional rehydration methods such as soaking the membrane in $D_2O$ until the $H_2O$ is reduced to desired (low) levels. Soaking at elevated temperature may be performed as well. Once in deuterated form the membrane can be handled as before.

It is important to point out that the ability to generate a high purity hydrogen isotope is not expected to be purer or exceed that what is commonly found in nature in the case of a hydrogen mixed gas stream, and in the case of a $D_2$ or $T_2$ mixed gas stream, is not expected to be purer or exceed the purity of the isotope found in the mixed gas stream. It is also imperative that all elements of the membrane and membrane electrode layers be treated with $D_2O$ (or $T_2O$) if there are any conventional water species in such a layer. For example, as small strands of perfluorosulfonic acid can be used as a membrane extender in the electrode layer (referred to as ionomer), this material also will have to be treated with $D_2O$. Any other species or layer, including any hydrated interfacial layer which has a water content must be pretreated. This would also apply to liquid acid electrochemical separators where any water or $^1H$ species would have to be ion exchanged with the desired isotope.

Also presented in FIG. 2 above is a membrane humidifier. As perfluorosulfonic acid membranes must have water to function, the water of the humidifier and also the water feed supplied to the humidifier must also be $D_2O$ or $T_2O$. This is also true of any water-centric humidifier membrane. Sometimes a perfluorosulfonic acid membrane is used within the humidifier. Such a humidifier would also require pretreatment in order to achieve high isotopic purity at process startup. Other membrane forms (beside perfluorosulfonic acid) that require hydration for proper operation would also require pretreatment.

The high cost of isotopic pure water may require the capture and reuse of process water entrained in the anode and or cathode gas exhaust streams. Purification processes such as adsorption beds (pressure swing adsorption, temperature swing adsorption, enthalpy wheels, palladium membranes, cold traps, and enthalpy exchange membranes for example) may be used to capture water. These processes can be integrated such that any water captured can be redirected to the water system and or the gas system prior to the anode chamber of the electrochemical pump. For instance, FIG. 2 shows a two-column pressure swing adsorption (PSA) unit with the regeneration waste stream directed back to the anode between an enthalpy exchange unit and a humidifier. FIG. 2 also shows the use of an enthalpy exchange unit for the purpose of reclaiming water from the anode exhaust gas and directing it to the anode inlet gas. These are just two examples of how water may be reclaimed and reused.

Another aspect of this invention is the formation of heavy water in process or in situ. A second part or aspect of this invention is that $D_2O$ (or $T_2O$) can be formed on site as part of the apparatuses or methods described herein with the desired isotopic phase of hydrogen. Specifically, any separated $D_2$ or $T_2$ can be combined with oxygen to form the heavy water of the desired isotope phase to be used in the process. As the gas to be recycled or reused was previously vented, any excess gas not recovered by the electrochemical process can be converted to the heavy water phase in the case of deuterium, or super heavy water phase in the case of tritium, and therefore considered an advantage in the process using heavy water. See balanced chemical reaction 2 (Rxn 2).

$$2D_2+O_2=2D_2O \tag{Rxn2}$$

It is pointed out the above is only an example. If a different membrane is used, all hydrogen, protons, or related hydrogen sources must be replaced by the desired isotopic phase. This includes water as well. This example can be extended to include phosphoric acid-based electrochemical processes, potassium hydroxide or its analogs, other acid based systems, as well as any solid state conductor.

As described herein, there are processes that require the use of $D_2$ and/or $T_2$ but do not chemically consume or otherwise alter the substance that is being processed. Recovery techniques such as electrochemical pumping, compression and purification may be employed as described to reclaim and recycle this high value substance. However, in some cases it may be more economical or technically feasible to chemically react $D_2$ so as to form another D-containing substance that can be recovered and reused in the process or used in a second process. This second D containing molecule may also be acted upon chemically or electrochemically to regenerate $D_2$ gas. The preferred deuterium and/or tritium containing molecule in this invention is heavy water, $D_2O$ and/or $T_2O$, respectively which are both very expensive and difficult to obtain.

The apparatus 10 and method of reclamation described above is just one example or embodiment of an industrial process that employs an isotope of hydrogen, D and/or T, where on-site or in situ generation of $D_2O$ and/or $T_2O$ is very desirable, either because the oxidation of the D and/or T is part of the reclamation process for these isotopes, or because the reclamation apparatus and/or method require $D_2O$ and/or $T_2O$ as an input material. The exemplary D or T apparatus 10 and method described herein demonstrate both reclamation by oxidation and in situ generation of $D_2O$ and/or $T_2O$ as an input material into the apparatus to perform the reclamation, such as providing in situ heavy water using generator 46 (FIG. 3), which could be provided to any portions of the apparatus requiring heavy water, including saturator proton exchange unit 12 and proton exchange membrane 20 or saturator 30, for example. The industrial apparatus and method described herein provide just one example of the importance of in situ $D_2O$ and/or $T_2O$ generation. The apparatuses and methods for in situ generation of $D_2O$ and/or $T_2O$ described herein may be utilized with any industrial apparatus and method that require these materials, including those that use or employ D and/or T in the manufacture of food, nutrition, or pharmaceutical products, agricultural products, semiconductors, fiber optics, or optoelectronics. While the industrial apparatus and method 10 may be one that employs D and/or T.

Figure 5:
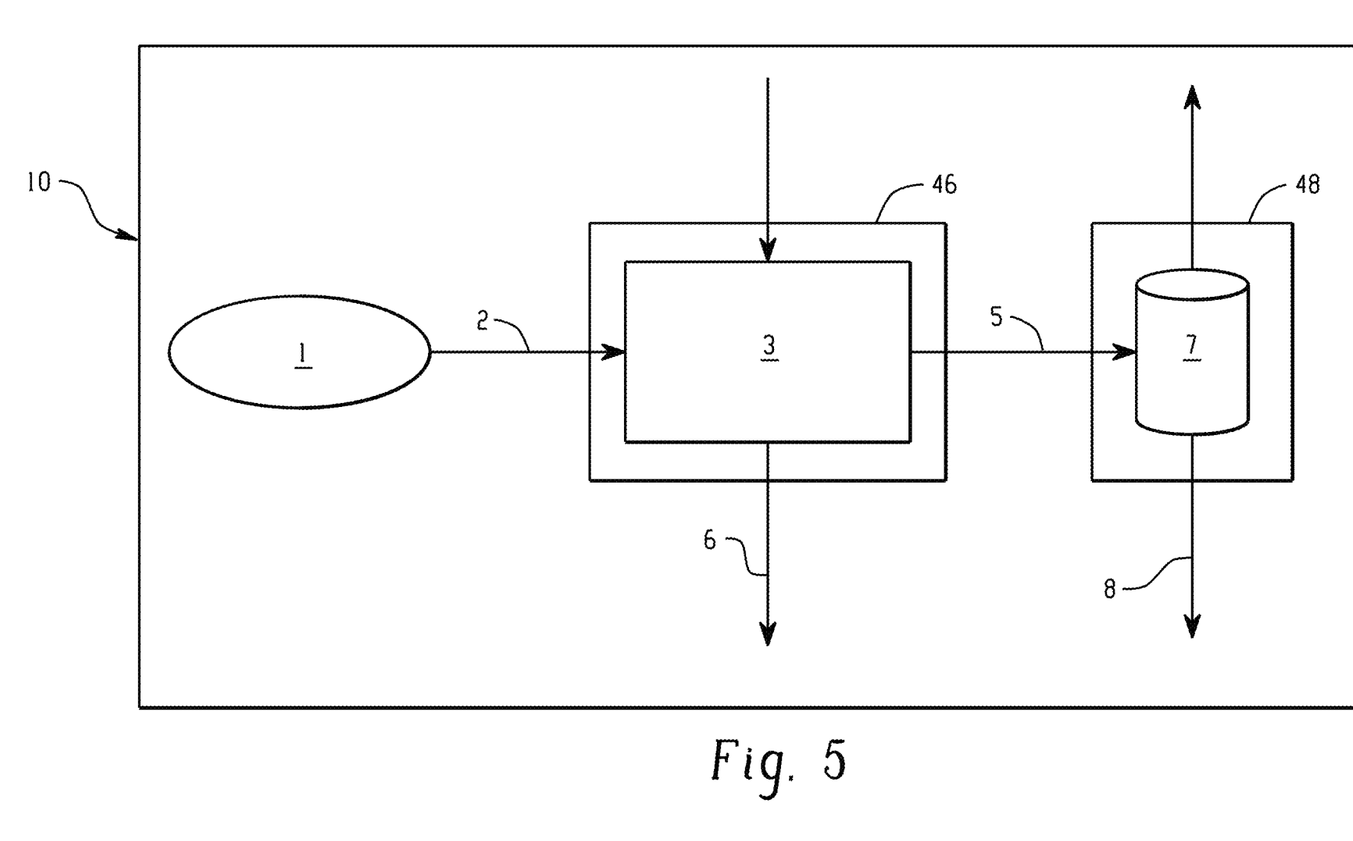
FIG. 5 is a schematic illustration of an embodiment of an industrial apparatus 10 and/or method that includes an embodiment of a $D_2O$ and/or $T_2O$ generator and reactor as described herein.

In one embodiment as illustrated in FIG. 5, the in situ $D_2O$ and/or $T_2O$ generator 46 may comprise a gas flow or stream 2 from a gas source 1 associated with apparatus 10 containing any amount (very low to 100%) of $D_2$ and/or $T_2$, respectively, is directed through a reactor 3 (e.g. generator 46) where the $D_2$ and/or $T_2$ is oxidized, preferably to $D_2O$ and/or $T_2O$, respectively. The product stream 6 from the reactor 3 may then be utilized within the apparatus 10, as described herein. The $D_2O$ and/or $T_2O$ is preferably collected in liquid form. It may be further processed or combined with other substances for further use or used directly within apparatus 10. The unreacted gas and vapor phase reacted flow of gas 5 is then collected in the collection apparatus 7, such as a condenser. The $D_2O$ and/or $T_2O$ vapor may be collected by any suitable vapor collection method, including various dehydration methods, e.g., adsorption, enthalpy exchange, and water transport media, and is provided from the collection apparatus 7 in the flow 8. The unreacted gas flow is also provided from the collection apparatus 7 and may also be used further within apparatus 10. Various stoichiometric ratios of D and O may be fed to the reactor 3. For example, a 2:1 ratio of D:O may be utilized in order to preferentially react close to 100% of the available $D_2$ and/or $T_2$ from the original gas stream, or alternately, to provide a non-stoichiometric ratio of D and O so as to ensure that there is excess oxygen to ensure complete reactivity of the D.

In another embodiment of this invention, the in situ generator 46 comprises a reactor (e.g. generator 46) and is used to simply combust the $D_2$ and/or $T_2$, respectively, with $O_2$ non-catalytically (or catalytically) to form $D_2O$ (Rxn 2) and/or $T_2O$, respectively. The $O_2$ may be provided from any suitable source of oxygen, such as a pressurized tank and regulator connected by a conduit or line to the reactor, or from atmospheric oxygen, or the oxygen may be evolved from a separate reactor as a reaction product.

In another embodiment of this invention, the in situ generator 46 comprises a fuel cell that is used to form $D_2O$ and/or $T_2O$ with the $D_2$ and/or $T_2$, respectively, that is to be reclaimed. This electrochemical-based process of generator 46 utilizes a suitable reaction medium for the isotope, such as a deuterium (and/or tritium) ion exchange transport membrane in one example, or a phosphoric acid electrolyte, and in other fuel cell processes, a high temperature carbonate or oxide conducting electrolyte. Independent of the electrolyte or fuel cell type, $D_2O$ and/or $T_2O$ will be formed. A further benefit and advantage of the fuel cell approach is that power and heat are by-products of the $D_2O$ and/or $T_2O$ formation, and the power and heat by-products may be employed in any suitable application, including anywhere within the apparatus 10 and method of its operation or use, or in other applications that are not related to apparatus 10.

In another embodiment of the oxidation process of Rxn 2 above, the in situ generator 46 comprises a reactor in which the $D_2$ and/or $T_2$ can be reacted with a non-oxygen molecule to form a deuterated and/or tritiated non-oxide compound. Examples include reaction of $D_2$ and/or $T_2$ with compounds that comprise CN, S, Cl, Br to form DCN, $D_2S$, DCl, DBr, to name a few. In these examples, the $D_2$ and/or $T_2$ is reacted with a halide such as chlorine, bromine, fluorine, or other halides or a compound comprising a CN moiety. Any and all deuterium and/or tritium analogs of halides, sulfides and phosphides, can be formed, for example. Following the formation of such non-oxide compounds, the non-oxide molecule, for the sake of an example, DCl, is formed, such DCl can then be burned or catalytically reacted in the presence of oxygen to form $D_2O$ and/or $T_2O$. These reactions may be performed in one reactor or in a plurality of reactors corresponding to the number of chemical reactions necessary to oxidize the $D_2$ and/or $T_2$. Similarly, $D_2$ and/or $T_2$ can be reacted with a non-oxygen molecule or intermediate to form a deuterated and/or tritiated non-oxide intermediate, and then converting the non-oxide intermediate to $D_2O$ and/or $T_2O$ via a separate reaction process, such as a combustion or catalytic process.

In another embodiment of the oxidation process of Rxn 2 above, the in situ generator 46 comprises a reactor or a plurality of reactors in which the $D_2$ and/or $T_2$ from the apparatus 10 or method, or for apparatuses 10 and methods that do not utilize $D_2$ and/or $T_2$ per se but require $D_2O$ and/or $T_2O$, can be reacted with a non-oxygen containing molecule to form a new D-containing and/or T-containing molecule including chalcogenides of the form VIB elements (S, Se, Te, Po) of the form $D_2X$ and/or $T_2X$, such as, for example, $D_2S$, $D_2Se$, $D_2Te$, or $D_2Po$.

In another embodiment of the oxidation process of Rxn 2 above, the in situ generator 46 comprises a reactor or a plurality of reactors in which the $D_2$ and/or $T_2$ from the apparatus 10 or method (i.e. the source) with a second molecule to form a new D-containing or T-containing molecule, including Group VIIA elements containing halides (F, Cl, Br, I, At), to form, for example, DF, DCl, DBr, DI, At.

In another embodiment of the oxidation process of Rxn 2 above, the in situ generator 46 comprises a reactor or a plurality of reactors in which the $D_2$ and/or $T_2$ from the apparatus 10 or method (i.e. the source) with a second molecule to form a new D-containing or T-containing molecule, including, for example, molecules comprising deuterides or tritides of the form XnDm, e.g., $TiD_2$, LiD, or any alkali metal deuteride or tritide, alkaline metal deuteride or tritide, transition metal deuteride or tritide, or a rare earth deuteride or tritide.

In another embodiment of the oxidation process of Rxn 2 above, the in situ generator 46 comprises a reactor or a plurality of reactors in which the $D_2$ and/or $T_2$ from the apparatus 10 or method (i.e. the source) with a second molecule to form a new D-containing or T-containing molecule, for example, molecules comprising deuterides or tritides of the form XnDm, Groups VA, IIIB, IVB, VB, VIB, or VIIB molecules, for example $ND_3$, $PD_3$, $AsD_3$, $SbD_3$, or $BiD_3$.

EXAMPLES

Tests were performed to investigate isotopic exchange within an electrochemical pump. The pump and humidifier were pre-treated with $D_2O$ and used to pump $D_2$. High isotopic purity was observed in gas exiting or being output from the electrochemical pump. Upon switching from using a $D_2O$ pretreated humidifier to a $H_2O$ humidifier a rapid increase in H was observed in gas exiting the pump. This demonstrated how readily isotopes are exchanged within the electrochemical device and supporting sub-systems.

Use of the appropriate isotopic form of water is required in order to maintain high isotopic purity of products evolving from electrochemical devices.

Referring now to FIG. 2, an embodiment of a hydrogen isotope recycling apparatus 10 for recycling or reclaiming an isotope of hydrogen 8 (e.g. D or T) is disclosed. The apparatus is configured to receive a gas stream 6 that is rich in a diatomic molecule of an isotope of hydrogen (e.g. $D_2$ or $T_2$, or possibly also $D_2O$ or $T_2O$). In one embodiment, the gas stream 6 may comprise only the diatomic molecule of the isotope of hydrogen being utilized. In other embodiments, the gas stream 6 is a mixed gas stream and includes one or more other gaseous constituents (e.g. $N_2$). The isotope rich gas stream or flow, including the mixed gas stream, may comprise a gas constituent outflow of any industrial process, including in one embodiment a heat treatment or annealing furnace or processing oven, such as a semiconductor device fabrication or annealing furnace, or a furnace or oven used as part of the manufacture or heat treatment of fiber-optic materials, or in the manufacture of pharmaceuticals, or any industrial process where treatment with a gaseous isotope of hydrogen provides enhanced characteristics to the material or materials being treated thereby and which includes a gas constituent outflow of the isotope of hydrogen. The hydrogen isotope recycling apparatus 10 shown in FIG. 2 includes a proton exchange unit 12. The proton exchange unit 12 may be any suitable proton exchange unit, including those of the types described herein, which in one embodiment is an electrochemical proton exchange unit 20 as described herein.

The proton exchange unit 12 includes an anode 14, a cathode 16, and an isotope-treated proton exchange medium 18 operatively disposed between and in conductive electrical contact with the anode and cathode, the isotope-treated proton exchange medium comprising heavy water ($D_2O$ or $T_2O$) containing the isotope of hydrogen therein, the device configured to receive a feedstream 6 containing the isotope of hydrogen. The hydrogen isotope recycling apparatus 10 is configured to receive the gas feedstream 6 at an inlet 22, provide the diatomic molecule of the hydrogen isotope to the anode 14 of the proton exchange unit 12 where the ions of the isotope are transported through the proton exchange medium 18, such as the electrochemical proton exchange membrane 20, to the cathode 16 where the reaction shown in FIG. 1 and described herein produces the gaseous diatomic molecule of the hydrogen isotope under pressure. Thus, the hydrogen isotope recycling apparatus 10 produces a compressed gas of the hydrogen isotope being recycled or reclaimed, which is available for reintroduction as an input into the process from which it was an outflow, or for any other purpose.

As may be understood from FIG. 1-4 and the description herein, various components of the hydrogen isotope recycling apparatus 10 utilize water. Advantageously, the hydrogen isotope recycling apparatus 10 utilizes or produces heavy water ($D_2O$) or super heavy water ($T_2O$) in the various components comprising a part thereof, such as the proton exchange medium 18, including the electrochemical proton exchange membrane 20, and in which all conventional water containing components of the apparatus are pre-processed using a heavy (or super heavy) water containing the isotope of hydrogen of the products to exchange hydrogen for the isotope of hydrogen. As will be appreciated, the hydrogen isotope recycling apparatus 10 may, in different embodiments as shown in FIGS. 2-4, incorporate a number of different components to support the function of the apparatus, but all of the components and chemical processes occurring therein that are utilized to handle or treat the feedstream 6 or output flow 24, and that have the capability of hydrogen exchange as described herein due to the materials of the component, the chemicals utilized, or the chemical processes involved will utilize hydrogen isotope-substituted materials, including chemical feedstocks (e.g. $D_2O$ or $T_2O$). In this way, contamination of the isotope contained in the feedstream 6 is avoided resulting in a compressed gas output flow 24 of the isotope of interest having a high purity. The compressed output flow 24 may be provided in any suitable output pressure in a range from 0-X psi, where X may be any amount compatible with the pressure handling capabilities of the components of the apparatus 10. If a pressure vessel is utilized, then the pressure may be up to the handling capabilities of the pressure vessel, and may include up to 12,000 psi, and more particularly up to 6,000 psi, and still more particularly up to 4000 psi. In one example, the range is from 500 to 12,000 psi, and more particularly 1000 to 6000 psi, and even more particularly 1,000 to 4,000 psi.

In one embodiment, the proton exchange apparatus is an electrochemical hydrogen isotope recycling apparatus for recycling an isotope of hydrogen, comprising: an electrochemical recycling unit, the unit comprising: an anode 14; a cathode 16; and an isotope-treated, water-based proton exchange membrane 20 operatively disposed between the anode and cathode, the isotope-treated, water-based proton exchange membrane having heavy water ($D_2O$ or $T_2O$) containing the isotope of hydrogen therein, the device configured to receive a feedstream containing the isotope of hydrogen. In one embodiment, the isotope-treated, water-based proton exchange membrane 20 comprises a perfluorosulfonic acid membrane 21. In another embodiment, the anode 14 or the cathode 16 or an interfacial layer associated with one or both of them comprises an ionomer or other water-containing layer 15 having the heavy water containing the isotope of hydrogen therein.

In the embodiment of FIG. 2, the apparatus 10 also includes a pre-filter trap 28 configured to receive an incoming mixed gas flowstream 6 comprising a gas that includes the gas comprising the isotope of hydrogen, and which may in certain embodiments of the process, include at least one other gas, wherein the pre-filter trap is configured to capture the at least one other gas. The at least one other gas may also be vented from the trap through the conduit and pressure regulator shown to the outlet for the mixed gas flowstream shown.

In the embodiment of FIG. 2, the apparatus 10 also includes a humidifier or saturator 30, the humidifier or saturator in fluid communication with and disposed upstream of the proton exchange unit 12 (e.g. electrochemical recycling unit 13) and is configured to humidify the feedstream 6 with heavy water containing the isotope of hydrogen. In one embodiment, the humidifier or saturator 30 comprises an isotope-treated, water-based proton exchange membrane 32 having heavy water containing the isotope of hydrogen therein. The saturator 30 also contains heavy water 34.

In the embodiment of FIG. 2, the apparatus 10 further comprises a dehumidifier 36 in fluid communication with and disposed downstream of the proton exchange unit 12. In various embodiments, the dehumidifier 36 comprises a cold trap, adsorbent, polymer membrane, ceramic membrane, film, palladium separator, or a pressure swing absorption unit 38 (FIG. 2). The dehumidifier is configured to remove heavy water, particularly water vapor, evolved from the proton exchange unit 12. The dehumidifier 36, including pressure swing absorption unit 38, is configured to remove heavy water vapor from the output flow to provide a dry output flow 24. The dehumidifier 36, including pressure swing absorption unit 38, is also configured to be selectively and periodically purged to remove the accumulated heavy water, which may include liquid heavy water and/or heavy water vapor, for recirculation and reuse anywhere within the apparatus 10, including to the saturator 30 as flow 40. In one embodiment, the dehumidifier 36 may comprises an isotope-treated, water-based proton exchange membrane having heavy water containing the isotope of hydrogen therein.

As used herein, it will be understood that gas and liquid flows are necessarily communicated in associated conduits, and that their flow may be controlled by various valves, pressure relief valves and pressure regulators. It will also be understood that these associated conduits may also include water traps that are adapted to capture condensation of heavy water vapors that may occur within the associated conduits, and that such water traps may also include outlet conduits 42 to return accumulated heavy water to any component of the apparatus where the same may be reused or stored for reclamation, including to a heavy water reservoir 44.

Referring now to FIG. 3, a second embodiment of the proton exchange apparatus 10 is illustrated. Elements labeled with the same element numbers have the same purpose and function as in the embodiments of FIGS. 2 and 4, and vice versa. In addition, elements or components found in the other embodiments (FIGS. 2 and 4) may be incorporated into the embodiment of FIG. 3 as options. In addition, in the embodiment of FIG. 3, the proton exchange apparatus 10 also includes a heavy water generator 46 to produce heavy water utilized in the apparatus. In this embodiment, the heavy water generator 46 is in fluid communication with an enthalpy exchange drier 48, which may be used to add or remove heat from the flow received from the generator, and may be utilized to provide liquid heavy water or heavy water vapor to other components of the apparatus. For example, in this embodiment the heavy water generator 46 is also in fluid communication the heavy water saturator and configured to provide a flow 54 of heavy water to the saturator. In this embodiment, the heavy water generator 46 utilizes the diatomic molecules of the isotope gas ($D_2$ or $T_2$) evolved at the anode 14 outlet 50 and chemically reacts it with a flow of $O_2$ 52 to produce heavy water or super heavy water, respectively. It will be understood that in various other embodiments a heavy water generator may be incorporated into the apparatus at any location that provides a source or flow of the diatomic molecules of the isotope gas ($D_2$ or $T_2$). In addition, the $D_2$ or $T_2$ could be from a make-up source (i.e. supplied directly and not from a process flow stream. Also, in some embodiments the source of oxygen may be air rather than a flow of $O_2$.

Referring now to FIG. 4, a third embodiment of the proton exchange apparatus 10 is illustrated. Elements labeled with the same element numbers have the same purpose and function as in the embodiments of FIGS. 2 and 3, and vice versa. In addition, elements or components found in the other embodiments (FIGS. 2 and 3) may be incorporated into the embodiment of FIG. 4 as options. In addition, in the embodiment of FIG. 4 includes a heavy water saturator 56 in fluid communication with and disposed downstream of the unit 12 configured to capture the heavy water containing the isotope of hydrogen evolved from the cathode 16. In various embodiments, the cathode 16 is configured for active or passive heavy water circulation and the heavy water saturator 56 may be incorporated to capture heavy water evolved from the cathode and/or provide a source of supply for circulation of heavy water at the cathode 16. In one embodiment, the cathode 16 comprises an actively flooded cathode 58. In this embodiment, the apparatus 10 also includes an optional circulation pump 60 in fluid communication with a cathode inlet 62 and a reservoir 64 and/or saturator 56 containing the heavy water, the pump 60 configured to actively pump the heavy water to the cathode inlet, the reservoir 64 and/or saturator 56 also in fluid communication with a cathode outlet 66 and configured to receive the heavy water evolved at the cathode outlet. In another alternate embodiment, the apparatus 10 the cathode comprises a passively flooded cathode. In this embodiment, the apparatus 10 further comprises a reservoir 64 and/or saturator 56 containing the heavy water having an outlet 68 disposed above and in fluid communication with a cathode inlet 62 and configured to a supply the heavy water to the cathode inlet, the reservoir having an inlet 70 disposed in a head space of the reservoir and/or saturator in fluid communication with the cathode outlet 66 and configured to receive the heavy water evolved at the cathode outlet by a bubble lift method. The cathode bubble lift and method requires the outlet of the $D_2O$ reservoir to be raised higher than the electrochemical stack such that the cathode side of the stack is fully submerged under water and ensuring that the cathode ports are oriented with the inlet at the bottom and outlet at the top. When gas is evolved on the cathode, bubbles form lifting slugs of $D_2O$ up to the phase separation head space of the $D_2O$ reservoir. This method can be used to passively circulate $D_2O$ for membrane hydration and cell stack cooling.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

Having thus described the invention, it is claimed:
1. An electrochemical hydrogen isotope recycling apparatus for recycling a feedstream comprising a single isotope of hydrogen, comprising:
   a gas stream comprising the isotope of hydrogen;
   a pre-filter trap configured to receive the gas stream;
   a humidifier in fluid communication with and disposed upstream of an electrochemical recycling unit and that is configured to humidify the gas stream with a heavy water containing the isotope of hydrogen;
   wherein the electrochemical recycling unit comprises
     an anode;
     a cathode;
     an isotope-treated, cation exchange membrane operatively disposed between the anode and cathode, the isotope-treated, cation exchange membrane having heavy water containing the isotope of hydrogen therein, the unit configured to receive the feedstream containing the single isotope of hydrogen;
   a heavy water generator that is in fluid communication with the humidifier and configured to provide a heavy water to the humidifier, wherein the heavy water generator comprises a reactor unit in fluid communication with the electrochemical recycling unit, wherein the reactor unit comprises a non-oxygen containing compound that is capable of reacting with the isotope of hydrogen in the feedstream to form a reaction product;

an enthalpy exchange drier that is in in fluid communication with the heavy water generator that is configured to add or remove heat from a stream received from the heavy water generator and to provide a liquid heavy water or heavy water vapor containing the isotope of hydrogen to the gas stream downstream of the pre-filter trap;

a dehumidifier in fluid communication with and disposed downstream of the electrochemical recycling unit; and wherein the single isotope is deuterium or tritium and when the single isotope is deuterium, the heavy water comprises $D_2O$ and when the single isotope is tritium, the heavy water is $T_2O$.

2. The apparatus of claim 1, wherein components of the apparatus containing a non-isotopic water are pre-processed using a heavy water containing the isotope of hydrogen to exchange hydrogen for the isotope of hydrogen.

3. The apparatus of claim 1, further comprising a saturator in fluid communication with and disposed downstream of a unit configured to capture the heavy water containing the isotope of hydrogen evolved from the cathode, and wherein the humidifier comprises an isotope-treated, cation exchange membrane having heavy water containing the isotope of hydrogen therein.

4. The apparatus of claim 1, wherein the dehumidifier comprises a cold trap, an adsorbent, a polymer membrane, a ceramic membrane, a film, a palladium separator, or a pressure swing absorption unit.

5. The apparatus of claim 1, wherein the isotope-treated, cation exchange membrane comprises an isotope-treated perfluorosulfonic acid membrane.

6. The apparatus of claim 1, wherein the anode or the cathode or an interfacial layer associated with one or both of them comprises an ionomer or other water-containing layer having the heavy water containing the isotope of hydrogen therein, wherein the cathode is configured for active or passive heavy water circulation, wherein the cathode is actively flooded with heavy water or wherein the cathode comprises a passively flooded cathode, further comprising a circulation pump in fluid communication with a cathode inlet and a reservoir containing the heavy water, the pump configured to pump the heavy water to the cathode inlet, the reservoir also in fluid communication with a cathode outlet and configured to receive the heavy water evolved at the cathode outlet.

7. The apparatus of claim 1, further comprising a reservoir; wherein the pre-filter trap is configured to receive the gas stream, wherein the gas stream comprises a gas that include the gas comprising the isotope of hydrogen and at least one other gas, wherein the pre-filter trap is configured to capture the at least one other gas; and wherein the reservoir contains the heavy water having an outlet disposed above and in fluid communication with a cathode inlet and configured to a supply the heavy water to the cathode inlet, the reservoir having an inlet disposed in a head space of the reservoir in fluid communication with a cathode outlet configured to receive the heavy water evolved at the cathode outlet by a bubble lift method.

8. An electrochemical hydrogen isotope recycling apparatus for recycling a feedstream comprising an isotope of hydrogen, comprising:
a gas stream comprising the isotope of hydrogen;
a pre-filter trap configured to receive the gas stream;
a humidifier in fluid communication with and disposed upstream of an electrochemical recycling unit and that is configured to humidify the gas stream with a heavy water containing the isotope of hydrogen;
wherein the electrochemical recycling unit, comprises
an anode;
a cathode;
isotope-treated, cation exchange membrane operatively disposed between the anode and cathode, the isotope-treated, cation exchange membrane having heavy water containing the isotope of hydrogen therein, the unit configured to receive the feedstream containing the isotope of hydrogen;
a heavy water generator that is in fluid communication with the humidifier and configured to provide a heavy water to the humidifier;
an enthalpy exchange drier that is in in fluid communication with the heavy water generator that is configured to add or remove heat from a stream received from the heavy water generator and to provide a liquid heavy water or heavy water vapor containing the isotope of hydrogen to the gas stream downstream of the pre-filter trap;
a dehumidifier in fluid communication with and disposed downstream of the electrochemical recycling unit; and
wherein the heavy water generator comprises a reactor unit in fluid communication with the electrochemical recycling unit, wherein the reactor unit comprises a non-oxygen containing compound that is capable of reacting with the isotope of hydrogen in the feedstream to form a reaction product.

9. The apparatus of claim 8, wherein the reactor unit is capable of reacting with the isotope of hydrogen in the feedstream to form an intermediate compound comprising a deuterated and/or tritiated non-oxide compound and wherein the reactor unit is capable of burning or catalytically reacting the intermediate compound in the presence of oxygen to form $D_2O$ and/or $T_2O$.

10. The apparatus of claim 8, wherein the non-oxygen containing compound comprises a halide, a compound comprising a CN moiety, S, Se, Te, Po, N, P, As, Sb, Bi, an alkali metal, an alkaline earth metal, or a rare earth metal.

11. A hydrogen isotope recycling apparatus for recycling an isotope of hydrogen, comprising:
a gas stream comprising the isotope of hydrogen;
a pre-filter trap configured to receive the gas stream;
a humidifier in fluid communication with and disposed upstream of an electrochemical recycling unit and that is configured to humidify the gas stream with a heavy water containing the isotope of hydrogen;
wherein the electrochemical recycling unit comprises:
an anode;
a cathode; and
an isotope-treated cation exchange medium operatively disposed between the anode and cathode, the isotope-treated cation exchange medium having heavy water containing the isotope of hydrogen therein, the device configured to receive a feedstream containing the isotope of hydrogen;
a heavy water generator that is in fluid communication with the humidifier and configured to provide a heavy water to the humidifier; the heavy water generator including a reactor in fluid communication with the electrochemical recycling unit;
an enthalpy exchange drier that is in in fluid communication with the heavy water generator that is configured to add or remove heat from a stream received from the heavy water generator and to provide a liquid heavy water or heavy water vapor containing the isotope of hydrogen to the gas stream downstream of the pre-filter trap;

a dehumidifier in fluid communication with and disposed downstream of the electrochemical recycling unit; and wherein components of the apparatus containing a non-isotopic water are pre-processed using a heavy water containing the isotope of hydrogen of the products to exchange hydrogen for the isotope of hydrogen; wherein at least one of the anode and the cathode comprise a water-containing layer that comprises the heavy water.

12. A process by which heavy water is produced using the apparatus of claim 1, the process comprising directing a feedstream to the electrochemical recycling unit comprising the single isotope of hydrogen;

directing a hydrogen stream comprising the single isotope of hydrogen from the anode of the electrochemical recycling unit to the reactor;

reacting the single isotope of hydrogen in the heavy water generator to produce heavy water.

13. The process of claim 12, wherein anode and cathode exhaust or outlet streams contain heavy water, whereby the process comprises recovering the heavy water at the anode and the cathode by a water recovery system and actively flooding the cathode with the heavy water.

14. The process of claim 12, further comprising adsorbing the heavy water evolved from the cathode in a pressure swing adsorber; and wherein the process further comprises recycling the heavy water or water vapor to the humidifier or to the anode.

15. The process of claim 12, further comprising actively flooding the cathode with the heavy water.

16. The process of claim 12, further comprising passively flooding the cathode with the heavy water by a bubble lift method, wherein the hydrogen isotope recycling apparatus further comprises a reservoir containing the heavy water having an outlet disposed above and in fluid communication with a cathode inlet and configured to a supply the heavy water to the cathode inlet, the reservoir having an inlet disposed in a head space of the reservoir in fluid communication with a cathode outlet configured to receive the heavy water evolved at the cathode using the bubble lift method.

17. The process of claim 12, further comprising receiving the gas stream in the pre-filter trap, wherein the gas stream comprises a gas that includes the gas comprising the isotope of hydrogen and at least one other gas, wherein the process further comprises capturing the at least one other gas.

18. The process of claim 12, wherein the reacting to form the heavy water comprises combustion.

19. The process of claim 12, further comprising measuring a $D_2O$ level using a $D_2O$ level sensor(s), wherein the measurement is performed by $D_2O$ mass sensor(s), monitoring the $D_2O$ level with a controller that can adjust the reaction rate, and directing a liquid $D_2O$ to a containment vessel.

20. The process of claim 12, further comprising measuring the reaction conditions to form a measured reaction condition output, wherein the reaction conditions include at least one of a reaction temperature, a reaction pressure, a thermal conductivity, a heat flux, or a concentration of at least one reactant, monitoring the measured reaction condition output via a controller, and adjusting the reaction conditions based on the measured reaction condition output.

* * * * *